United States Patent [19]
Ikegami

[11] Patent Number: 5,712,831
[45] Date of Patent: *Jan. 27, 1998

[54] TIMPIECE

[75] Inventor: Toshimasa Ikegami, Suwa, Japan

[73] Assignee: Seiko Epson Corporation, Tokyo, Japan

[*] Notice: The term of this patent shall not extend beyond the expiration date of Pat. No. 5,416,752.

[21] Appl. No.: 407,816

[22] Filed: Mar. 21, 1995

Related U.S. Application Data

[63] Continuation of Ser. No. 864,153, Apr. 2, 1992, Pat. No. 5,416,752, which is a continuation of Ser. No. 221,497, Jul. 19, 1988, which is a continuation-in-part of Ser. No. 164,299, Mar. 4, 1988.

[30] Foreign Application Priority Data

Jul. 21, 1987 [JP] Japan ............................ 181341/87
Dec. 9, 1987 [JP] Japan ............... (UM) 187315/87U

[51] Int. Cl.⁶ .......................... G04C 23/00; G04B 37/00
[52] U.S. Cl. ............................................. 368/88; 368/316
[58] Field of Search ............................... 368/85, 88, 203, 368/204, 220, 276, 299, 300, 318

[56] References Cited

U.S. PATENT DOCUMENTS

| | | | |
|---|---|---|---|
| 3,613,353 | 10/1971 | Kock | 368/78 |
| 3,698,073 | 10/1972 | Helda |  |
| 3,747,327 | 7/1973 | Uchiyama |  |
| 3,777,365 | 12/1973 | Umbaugh |  |
| 3,942,854 | 3/1976 | Klein et al. |  |
| 4,175,374 | 11/1979 | Yoshizawa | 368/300 |
| 4,342,105 | 7/1982 | Dorfman | 368/88 |
| 4,351,040 | 9/1982 | Aoki |  |
| 4,405,242 | 9/1983 | Kosaka et al. |  |
| 4,437,768 | 3/1984 | Miyasaka | 368/88 |
| 4,460,281 | 7/1984 | Othenin-Girard |  |
| 4,478,524 | 10/1984 | Saitoh et al. |  |
| 4,722,076 | 1/1988 | Schnell | 368/220 |
| 4,851,803 | 7/1989 | Hahn | 336/176 |
| 4,862,432 | 8/1989 | Hiraga et al. | 368/88 |
| 4,876,677 | 10/1989 | Moriya | 368/87 |
| 4,885,559 | 12/1989 | Nakano | 336/92 |

FOREIGN PATENT DOCUMENTS

| | | |
|---|---|---|
| 1021066 | 11/1977 | Canada . |
| 0145327 | 6/1985 | European Pat. Off. . |
| 7518118 | 5/1976 | France . |
| 2165418 | 7/1972 | Germany . |
| 2449739 | 4/1976 | Germany . |
| 54-97143 | 12/1977 | Japan . |
| 62-47570 | 8/1987 | Japan . |
| 638368G | 9/1983 | Switzerland . |
| 1588527 | 4/1981 | United Kingdom . |
| 2090055 | 6/1982 | United Kingdom . |
| 2114821 | 8/1983 | United Kingdom . |
| 2125584 | 3/1984 | United Kingdom . |
| 2149980 | 6/1985 | United Kingdom . |
| 8300585 | 2/1983 | WIPO . |

*Primary Examiner*—Vit W. Miska
*Attorney, Agent, or Firm*—Stroock & Stroock & Lavan LLP

[57] ABSTRACT

A timepiece includes a main plate and gear train bridge with a center wheel and pinion supported therebetween by one or more bearing members integrally formed in the main plate and gear train bridge. A plurality of springs integrally formed in said plate and bridge are used for positioning internal members of the timepiece relative to each other. Additional similar springs are used for fixing the frame structure to the casing of the timepiece. A pressing plate can be connected to the main plate and includes one or more leaf springs for fixing a back cover of the timepiece away from the frame structure. One or more of the plates or bridge can be electrically conductive for delivery of current to an internal member.

9 Claims, 11 Drawing Sheets

FIG. 15

TIMEPIECE

CROSS REFERENCE TO RELATED APPLICATION

This is a continuation of U.S. patent application Ser. No. 07/864,153 filed on Apr. 2, 1992 for TIMEPIECE now U.S. Pat. No. 5,416,752, which is a continuation application of application Ser. No. 07/221,497 filed on Jul. 19, 1988 for TIMEPIECE, which is a continuation-in-part of U.S. patent application Ser. No. 07/164,299 filed on Mar. 4, 1988.

BACKGROUND OF THE INVENTION

This invention relates to a timepiece, and more particularly to the bearing and frame structures of a timepiece.

Conventional timepieces employ resilient (i.e. elastic) portions which press against internal members of the timepiece to properly position and maintain the position of these internal members relative to each other. These resilient portions are separately formed from a gear train bridge of the timepiece. The frame of the timepiece is individually formed from a ribbon-shaped or a resin-molded thin plate to reduce the frame cost. The gear train bridge is also individually formed from a relatively thick material on which a recess or the like is provided which serves as a notch.

The number of separately formed pieces and differences in the thickness of material used to form the timepiece require a number of different processing techniques. Consequently, the time and cost to manufacture the timepiece is relatively high. Servicing of the timepiece due to the plurality of individual pieces is also inconvenient.

Frames of timepieces formed from ribbon-shaped thin plates are relatively fragile and must be specially and carefully treated to prevent being damaged from external forces such as being inadvertently dropped (i.e. drop impact). Frames formed from resin-molded thin plates require additional time to manufacture and cannot be manufactured with the degree of precision (i.e. accuracy) desired due to deformation thereof from heating.

It is therefore desirable to provide a timepiece where both the bearing and resilient members of the timepiece are formed as part of the frame. The cost of manufacturing the frame and bearing structures of the timepiece should be reduced and the relative strength of the frame should be increased compared to frame and bearing structures of conventional timepieces. The manufacturing precision should be increased and manufacturing time reduced resulting in a further reduction in the manufacturing cost of the timepiece compared to conventional timepieces.

SUMMARY OF THE INVENTION

Generally speaking, in accordance with the invention, a timepiece having a plurality of internal members includes a power source for producing electrical current, a first frame having one or more bearing members and a second frame connected to the first frame. A center wheel having a pinion is supported between the first frame and the second frame by the one or more bearing members.

The timepiece includes one or more biasing members integrally formed with either the first frame or the second frame. At least one biasing member is used for positioning at least two of the internal members (e.g. an integrated circuit (IC) chip and coil lead substrate) of the timepiece relative to each other by exerting pressure against at least one of these two internal members whereby a path between these two internal members for the conduction of electric current is created. In one preferred embodiment, one of the biasing members is electrically conductive and connects the IC chip to a terminal of a battery. Additionally, one or more of the biasing members are leaf springs for fixing the frame structure to the casing of the timepiece. Each of the bearing members is integrally formed with either the first or second frame.

A main plate, which serves as one of the two frames, is formed from a thin plate and has a plurality of flat portions and a plurality of bent portions around its circumference. The bent portions are formed by plastic working (i.e. forging, bending, drawing and/or shearing) of the thin plate. The plurality of flat portions are disposed between these bent portions and are formed by processes including half-blanking, stretching (i.e. drawing) and/or bending.

The main plate also includes a plurality of tie bars extending radially outwardly therefrom for positioning at a predetermined distance from the main plate, a case ring or case (i.e. outer housing) of the timepiece. A pressing plate also can be connected to the main plate and includes one or more leaf springs for fixing a back cover of the timepiece away from the frame structure. Additionally, integrally connected spring members of the pressing plate are used in lieu of the one or more biasing members of the first or second frame for properly positioning the internal members within the timepiece.

Accordingly, it is an object of the invention to provide an improved timepiece which includes less separate parts and thereby reduces the manufacturing cost of the timepiece compared to commercially available timepieces.

It is another object of the invention to provide an improved timepiece having a strengthened frame which is manufactured with a higher degree of precision than commercially available timepieces.

It is a further object of the invention to provide an improved timepiece which can be manufactured in less time and thereby further reduces the manufacturing cost thereof.

It is still another object of the invention to provide an improved timepiece having a bearing structure which is integrally connected to the frame structure.

It is still a further object of the invention to provide an improved timepiece in which the biasing members are integrally connected to the frame structure.

Still other objects and advantages of the invention will in part be obvious and will in part be apparent from the specification.

The invention accordingly comprises several steps in a relation of one or more of such steps with respect to each of the others, and the apparatus embodying features of construction, a combination of elements and arrangements of parts which are adapted to effect such steps, all is exemplified in the following detailed disclosure and a scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
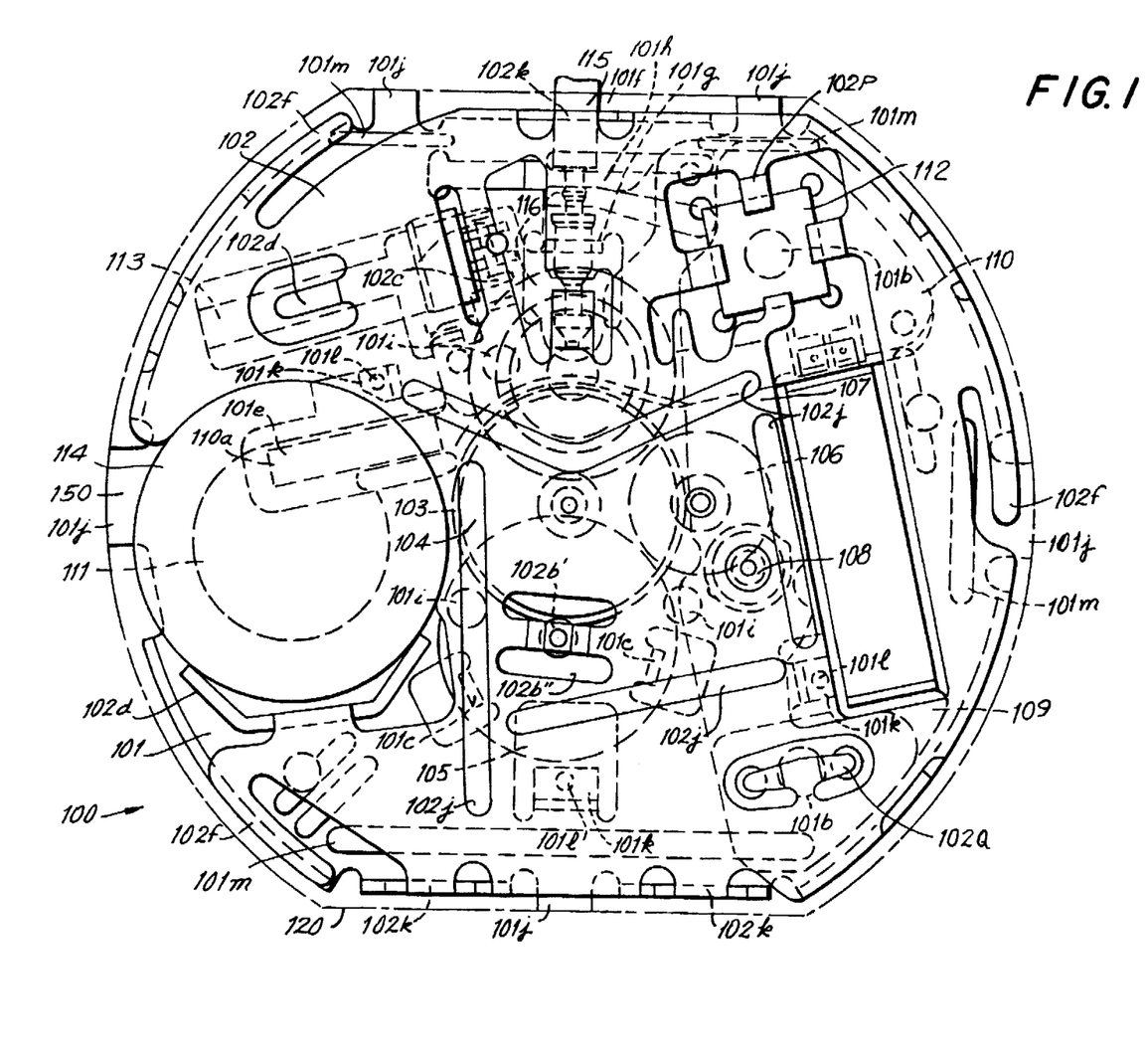
FIG. 1 is a top plan view of a timepiece in accordance with one embodiment of the invention.
Figure 2:
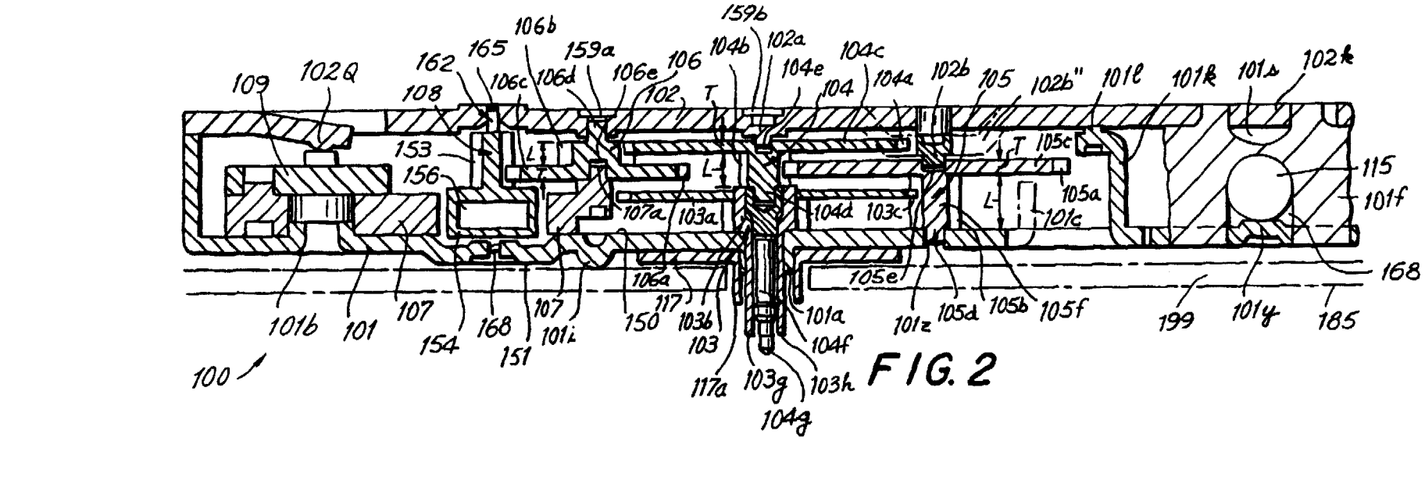
FIGS. 2, 3, 4a, 4b and 5 are fragmented developed cross-sectional views through different portions of FIG. 1.

As shown in FIGS. 1 and 2, a timepiece 100 includes a main plate 101 and a gear train bridge 102 connected to a front surface 150 of main plate 101. A center gear and pinion 103, which includes a center gear wheel 103a having teeth 103c and a pinion 103b, are rotatably supported by main plate 101. Pinion 103b extends through a bushing 101a formed in main plate 101 and includes a hollow shaft 103h having a distal end 103g. Rotatably disposed within shaft 103h of pinion 103b is an outer shaft 104f of a fourth wheel and pinion 104. Outer shaft 104f has a distal end 104g. Fourth wheel and pinion 104 also includes a pinion 104b and a gear wheel (collar) 104c having teeth 104a around its circumference. An inner shaft 104d of fourth wheel and pinion 104 is interference fit in an opening at the top of outer shaft 104f. A dowel 102a of gear train bridge 102 protrudes into a concave portion 104e of fourth wheel and pinion 104, rotatably supporting wheel 104 and serving as an upper pivot. By this construction, center wheel and pinion 103 and fourth wheel and pinion 104 are piled one upon the other and mutually support each other for rotation on frames 101 and 102.

The amount of play (i.e. looseness) of center wheel and pinion 103 and fourth wheel and pinion 104 in their axial directions is determined by a half-blanking process which is used to form these mechanisms. In the half-blanking process, material is sheared (commonly referred to as press working) to approximately one half of its original thickness. Pinion 104b, gear wheel 104c, inner shaft 104d and concave portion 104e of gear mechanism 104 are formed by forging (with or without heating) and teeth 104a are formed by shearing or blanking.

Pinion 104b meshes with the teeth 105a of a third wheel 105c of third wheel and pinion 105. Third wheel and pinion 105 also includes a pinion 105b, and a shaft ending in a pivot defined by a distal end 105d of lesser diameter. A dowel 102b formed in a support 102b' bridging holes 102b", all formed in gear train bridge 102, extends into a concave portion 105e of third wheel and pinion 105c for rotatably supporting and serving as an upper pivot for the latter. Pinion 105b and the shaft terminating in distal end 105d is formed by forging. Teeth 105a of third wheel 105c are formed by blanking. Distal end 105d of pinion 105b rotatably extends within an opening 101z of main plate 101. Dowel 102b is formed by half-blanking and plastic working. Support 102b' is formed by drawing. Holes 102b" are formed by punching or blanking. Main plate 101 also includes flexural portions 101c protruding above top surface 150 of main plate 101 for preventing the inclining of third wheel and pinion 105 during assembly.

Teeth 104a of fourth wheel and pinion 104 mesh with a pinion 106b of a fifth wheel and pinion 106. Fifth wheel and pinion 106 also includes a shaft 106d, a fifth wheel 106c having teeth 106a and a concave portion 106e. The structure of fifth wheel and pinion 106 is similar to third wheel and pinion 105 Concave portion 106e of fifth wheel and pinion 106 is rotatably supported by a protrusion 107a formed in a stator 107. Fifth wheel 106c and pinion 106b have external diameters D1 and D2, respectively. Preferably external diameter D1 is equal to or less than three times external diameter D2 (i.e. D1/D2<3). Shaft 106d rotatably pivots within an opening 159 in gear train bridge 102. Pinion 106b should have a height L of not less than 0.4 mm and should include not more than eight teeth which mesh with teeth 104a of fourth wheel and pinion 104. Pinion 106b, which can be made from a copper alloy or other suitable material, is preferably made from brass or aluminum. The ratio of a thickness T of each wheel and height L of each associated pinion for wheel and pinions 104, 105 and 106 is desirably not greater than one half in order to provide a thin movement. By applying a half-blanking process to the portions of gear train bridge 102 supporting wheel and pinions 104 and 106, less contact resistance with gear train bridge 102 is created. Consequently, wheel and pinions 104 and 106 are able to more freely rotate and do not require the use of jewels (i.e. stones) or the like to control their movement. Applying a half-blanking process to gear train bridge 102 around openings 159a and 159b creates oil reservoir for timepiece 100.

Teeth 106a, which can be made by forging, mesh with teeth 153 of an outer plastic housing 154 of a rotor 108. Rotor 108 also includes an annular magnet 156. An upper pivot 162 of rotor 108 rotates within an opening 165 of gear train bridge 102 and a lower pivot 167 within an opening 168 of main plate 101. Consequently, gear train bridge 102 and main plate 101 provide pivotable support for rotor 108. Openings 165 and 168 are formed by blanking. Stator 107 is positioned in the horizontal direction between two bushings 101b in main plate 101 protruding above top surface 150.

Figure 3:
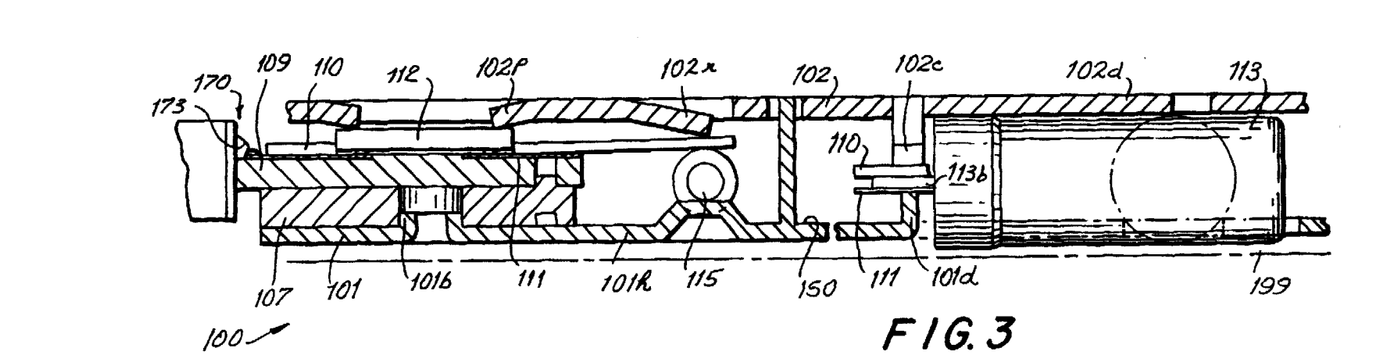

As shown in FIG. 3, a coil block 170 includes a magnetic core 109, a coil lead 173, a coil lead substrate 110 on which coil lead 173 is terminated (i.e. for terminal treatment of coil lead 173) and an insulating plate 111 on which coil lead substrate 110 is mounted. Coil lead substrate 110 includes a wiring pattern at the side of magnetic core 109 and a copper foil pattern 110a. The external periphery of an integrated circuit (IC) chip 112 is guided into position on coil lead substrate 110 by an opening within coil lead substrate 110. The wiring pattern of coil lead substrate 110 is laid out within this opening so as to be disposed directly beneath and oppose the terminals (ports) of the IC chip 112 defined by bumps made for example, of gold (A). A showing of these bumps and an embodiment of the mounting of a chip in a timepiece in accordance with the invention is found in U.S. patent application Ser. No. 07/164,299, and the disclosure of that application is incorporated herein by reference as if fully set forth herein.

Springs 102P of gear train bridge 102 press against IC chip 112 so as to bias IC chip 112 towards coil lead substrate 110. Consequently, the bumps of gold of IC chip 112 make electrical contact (i.e. creates a conductive state) with the wiring pattern of coil lead substrate 110. The pressure created by springs 102P also forces coil lead substrate 110 to press against insulating plate 111 which, in turn, presses magnetic core 109 against stator 107. Magnetic core 109 is therefore properly positioned relative to stator 107 so that the magnetic field produced by magnetic core 109 is magnetically coupled to stator 107, and in particular to the end portions of stator 107.

Figures 4A, 4B, 5:
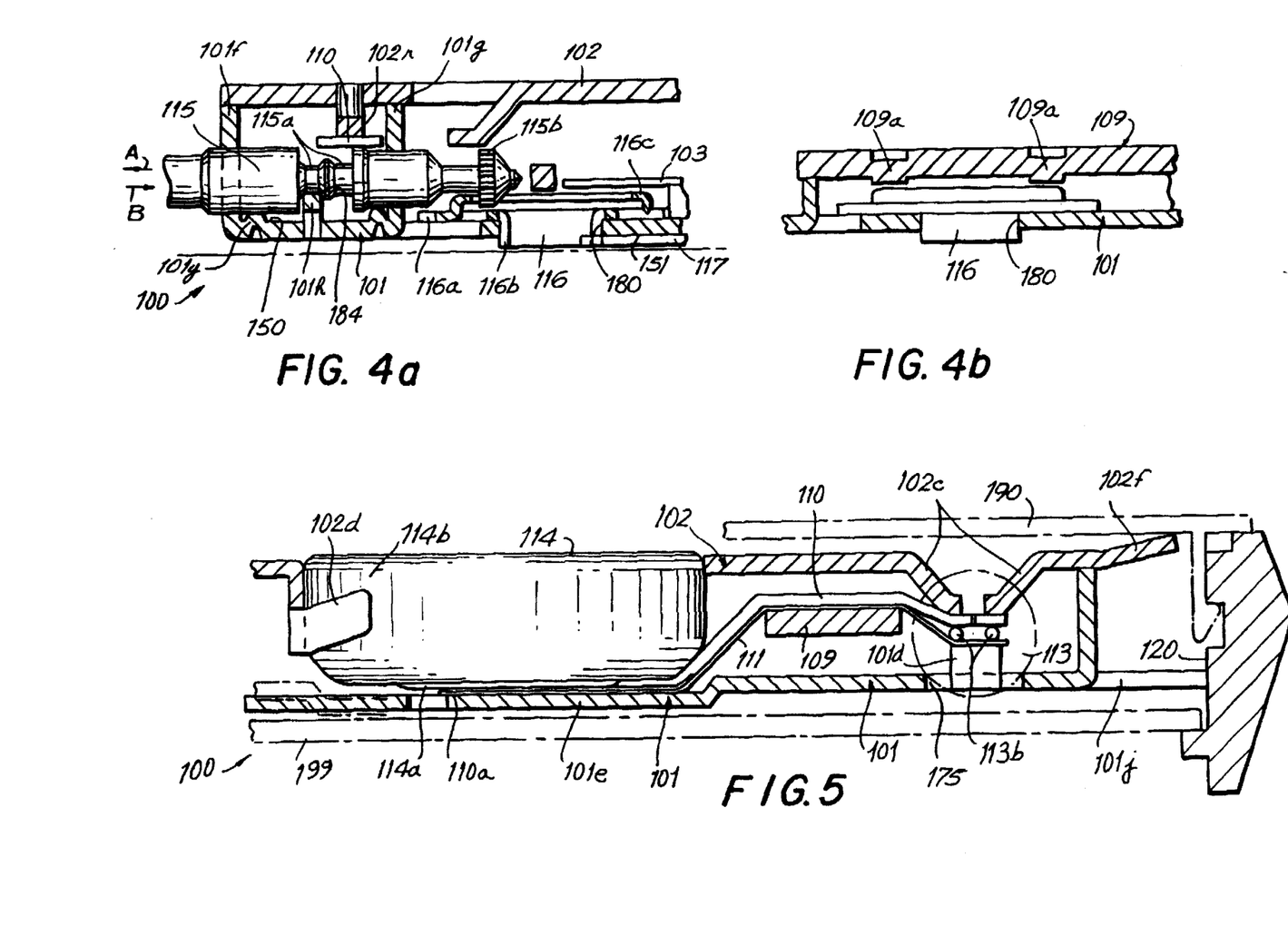

As best shown in FIG. 5, a crystal oscillating unit 113 is positioned within an opening 175 of main plate 101. Opening 175 extends in a horizontal direction along main plate 101. A pair of springs 102c which are integrally connected to gear train bridge 102 press against coil lead substrate 110. The wiring pattern (not shown) of coil lead substrate 110 in the vicinity of crystal oscillating unit 113 faces main plate 101. The pressure exerted by springs 102c against coil lead substrate 110 biases the wiring pattern against a pair of terminals 113b of crystal oscillating unit 113 resulting in a solid electrical connection therebetween.

The pressure from springs 102c also presses coil lead substrate 110 against insulating plate 111 which bears on an upwardly bent tab 101d formed from main plate 1, which serves as a resistance member against the force of springs 102c. As shown in FIGS. 1 and 3, one of the plurality of springs 102d presses against crystal osciallating unit 113. As shown in FIGS. 1 and 5, a spring 101e integrally connected to main plate 101 presses against insulating plate 111 which in turn presses against an electrical conductor such as a piece of copper 110a. Piece 110a is disposed between an edge of coil lead substrate 110 and a negative terminal 114a of a battery 114. Through the pressure exerted indirectly by spring 101e, piece 110a provides an electrical connection between the negative terminal of battery 114 and the wiring pattern of coil lead substrate 110. Two of the plurality of springs 102d formed in gear train bridge 102 exert pressure against a positive terminal 114b of battery 114 providing an electrical connection thereto. Gear train bridge 102 is made from an electrically conductive material. Therefore, an electrical path from positive terminal 114b of battery 114 through gear train bridge 102 to a $V_{DD}$ terminal of IC chip 112 is established.

As shown in FIGS. 1, 4a and 4b, extending from main plate 101 toward gear train bridge 102 are flexure portions 101f and 101g for guiding and positioning a winding stem 115 in the region between main plate 101 and gear train bridge 102. Winding stem 115 is positioned in a vertical direction between plate 101 and bridge 102 and is guided for displacement parallel to top surface 150 of main plate 101 (i.e. the horizontal direction). Winding stem 115 is also guided by a projection 101y which protrudes above top surface 150 of main plate 101. Flexure portions 101f and 101g are formed by bending each with a U-shaped opening 168, one of which is shown in FIG. 2. Winding stem 115 is biased in the direction of main plate 101 by spring 102r formed in gear train bridge 102, which bears on a portion of coil lead substrate 110, which in turn bears on winding stem 115. By providing flexure portions 101f and 101g and projection 101y, as described above, any deformation normally provided in a guide hole during bending of flexure portions 101f and 101g and inaccuracy in the diameter of the guide hole does not adversely affect movement of winding stem 115 in the directions denoted by arrows A and B.

Winding stem 115 includes a two-part stepping portion 115a and a pinion 115b. A click spring 101h is positioned on top surface 150 of main plate 101 to contact and bias stepping portion 115a. An end portion (not shown) of click spring 101h is bent. Removal of winding stem 115 is accomplished by pressing down against this end portion of click spring 101h using an appropriate instrument. Once the end portion of click spring 101h is pressed down by the instrument, click spring 101h is no longer in contact with stepping portion 115a allowing winding stem 115 to be easily removed from timepiece 100.

In normal operation, when winding stem 115 is pulled out slightly (i.e. one step) in the direction of arrow A, click spring 101h presses against a central sloped portion 184 of stepping portion 115a and is cammed over the sloped portion 184 into the other part of stepping portion 115a. Pinion 115b now engages a plurality of teeth 116c of a minute wheel 116. By rotating winding stem 115, teeth 116a of minute wheel 116 meshingly rotates with pinion 103b of second wheel and pinion 103 resulting in the desired repositioning of a minute hand (not shown) which is attached to distal end 103g of shaft 103h.

Click spring 101h is cut so that a portion thereof defines almost no gap with top surface 150 of main plate 101 in the vertical direction. Such a cut is commonly referred to as "zero cut". By zero cutting a portion of click spring 101h, winding stem 115 is prevented from being pulled out too far from case 120. In particular, by providing a zero cut of click spring 101h so that substantially no gap exists between a portion of click spring 101h and main plate 101, the force (i.e. thrust) exerted on winding stem 115 when pulled outwardly away from case or case ring 120 in the direction of arrow A is substantially transmitted to main plate 101 through the zero cut portion of spring click 101h. Accordingly, the portion of click spring 101h in contact with stepping portion 115a is not distorted in the direction of the thrust.

Minute wheel 116 includes a plurality of teeth 116a which mesh with pinion 103b of gear 103 and a pinion 116b which meshes with an hour wheel 117. A plurality of teeth 116c of minute wheel 116 extending towards gear train bridge 102 are operable for meshing with pinion 115b when winding stem 115 is pulled outwardly from case 120 as described above. Accordingly, when pinion 115b meshes with teeth 116c, teeth 116b meshingly rotate hour wheel 117 so that an hour hand (not shown) which is attached to a shaft 117a of hour wheel 117 (see FIG. 2) is repositioned as desired.

Figures 6, 7A:
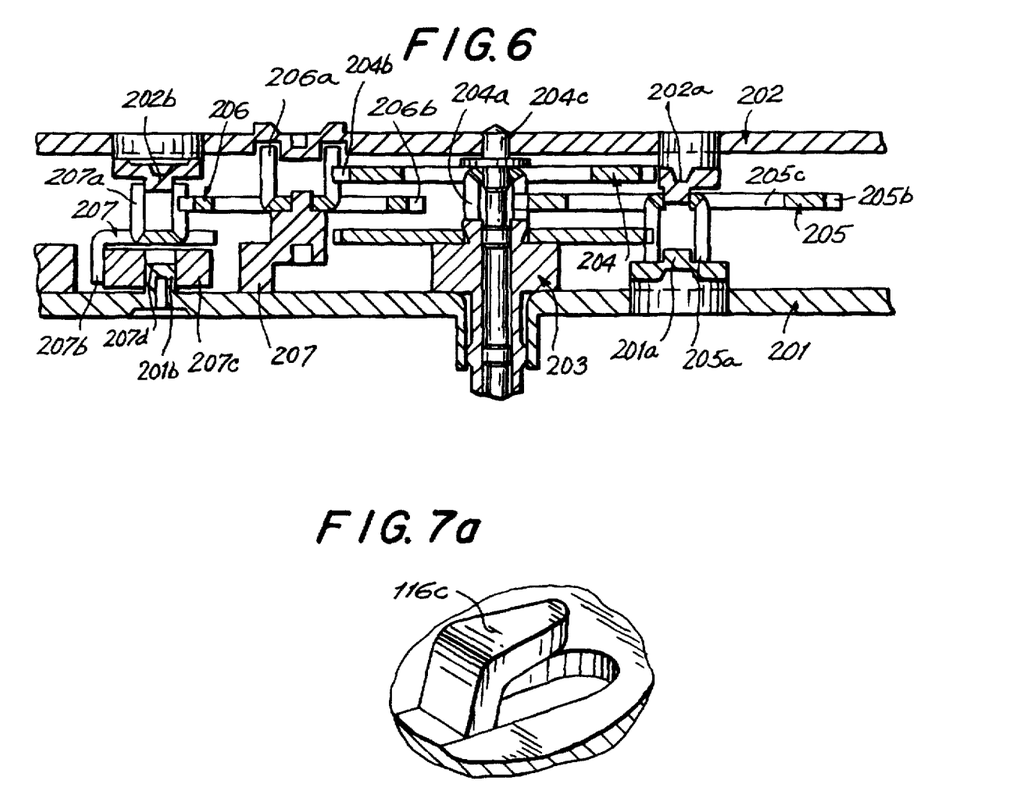
FIG. 6 is a fragmented developed cross-sectional view of a timepiece in accordance with an alternative embodiment of the invention.
FIG. 7a is a perspective view of a tooth from a first set of teeth of a minute wheel.
Figure 7B:
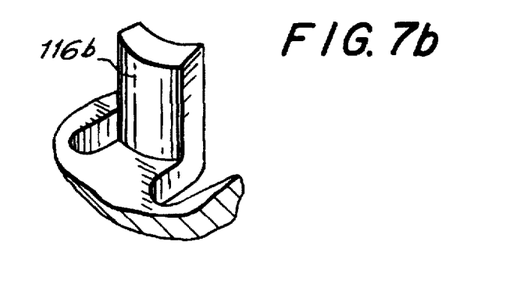
FIG. 7b is a perspective view of a tooth from a second set of teeth of the minute wheel.

As shown in FIG. 7b, each of a plurality of teeth 116b (shown upside down as compared to their position in FIG. 4) is made by cutting a partial ring in minute wheel 116 and then bending the cut portion of minute wheel 116 within the partial ring at a substantially 90° angle. As shown in FIG. 7a, the plurality of teeth 116c (only one of which is shown) are made by shearing the plane of minute wheel 116 and then bending each of the plurality of teeth 116c at a first right angle and then the distal end thereof at a second right angle. Teeth 116a are made by shearing the edge of minute wheel 116.

Referring once again to FIGS. 4a and 4b, the plurality of teeth 116b form the equivalent of a pinion, the root of which is supported by top surface 150 of main plate 101. Teeth 116b extend through an opening 180 of main plate 101. The degree of freedom of movement in the axial direction of minute wheel 116 is determined by protrusions 109a which extend from magnetic core 109 and are formed by half blanking.

Hour wheel 117 is located on a rear surface 151 of main plate 101. As shown in FIG. 2, a protrusion 101i extending from rear side 151 of main plate 101 provides a sufficient gap between main plate 101 and a dial face 199 of timepiece 100 to allow hour wheel 117 to freely rotate. Projection 101i is made by drawing or half-blanking.

Referring once again to FIG. 1, main plate 101 is made from a thin plate of ribbon-shaped material. A plurality of main plates 101 are formed on (e.g. stamped out of) the ribbon-shaped material and connected to the unused portions of the ribbon-shaped material by tie bars 101j. As shown in FIG. 5, gear train bridge 102 includes a plurality of springs 102f which resiliently contact a back cover 190 of timepiece 100. Main plate 101 is prevented from moving towards dial face 191 by protrusions 101c which are in contact with a dial face 191 (see FIG. 2). Advantageously, no intermediate frame is required by timepiece 100 in contrast to conventional timepieces. Timepiece 100 and specifically main plate 101 and gear train bridge 102 also can be mass produced at a lower manufacturing cost compared to conventional timepieces.

As shown in FIG. 2, main plate 101 also includes a plurality of integrally connected L-shaped portions 101k having stems which extend towards gear train bridge 102 and legs which are substantially parallel to gear train bridge 102. A protrusion 101l on each leg 211 is in contact with gear train bridge 102. The distance separating main plate 101 from gear train bridge 102 is therefore equal to the combined heights of L-shaped portion 101k and protrusion 101l. Protrusions 101l are formed by drawing or half blanking. Generally, L-shaped portions 101k and, in particular their height, varies significantly (i.e. variation in tolerance is high). Consequently, L-shaped portions 101k cannot be used by themselves to provide an acceptable predetermined distance separating main plate 101 from gear train bridge 102. By using protrusions 101l, which can be made to vary in height, variations in the height of L-shaped portions 101k can be compensated for. Main plate 101 is connected to gear train bridge 102 through an interference fit between a concave circumferential portion 101s of main plate 101 and a corresponding convex portion 102k of gear train bridge 102.

The circumference of main plate 101 is bent or stretched (i.e. drawn) except for tie bars 101j to prevent distortion and improve the rigidity of main plate 101. A plurality of beats 101m (FIG. 1) are formed by drawing or half-blanking near the regions of the circumference of main plate 101 not otherwise bent or drawn. Additionally, a plurality of beeds 102j are formed in gear train bridge 102, particularly near pivot holes for the wheels to gear train. Beeds 102j, which are deformed portions of a thin plate in the shape of grooves, improve the rigidity and prevent the distortion of gear train bridge 102. A pair of springs 102Q and 102r press against magnetic core 109 and coil lead substrate 110 to further hold the same in place, respectively.

Timepiece 100 operates as follows. An alternating magnetic field across stator 107 causes rotor 108 to rotate. The alternating magnetic field is created by providing an alternating current to the coils of stator 107 from IC chip 112. The frequency of the alternating current is controlled by the oscillating signal produced by crystal oscillating unit 113. Rotation of rotor 108 causes fifth wheel and pinion 106 to rotate which in turn rotates fourth wheel and pinion 104. Since teeth 105a of third wheel and pinion 105 mesh with pinion 104b of fourth wheel and pinion 104, third wheel and pinion 105 rotates. Through the meshing of teeth 103c of center wheel and pinion 103 with pinion 105b, center wheel and pinion 103 also rotates. Wheel and pinions 103 and 104 rotate independently of each other due to the loose fitting of shaft 104f within shaft 103h. The hands (not shown) of timepiece 100 are connected to distal end 103g of pinion 103b and distal end 104g of shaft 104f above a surface 185 of dial face 199. By moving winding stem 115 outwardly from casing 120 so that pinion 115b meshes with teeth 116c of minute wheel 116, the position of the hands can be adjusted as desired.

An alternative gear train bridge 201 is shown in FIG. 6. Wheel and pinions 203, 204, 205, and 206 are substituted for wheel and pinions 103, 104, 105 and 106, respectively. Additionally, a rotor 207 is used in lieu of rotor 107. All other elements of timepiece 100 are the same as disclosed above. A pinion 205a of gear 205 is formed by being bent after a zero cut is made to provide a hole about which pinion and pivots on a protrusion 201a formed on a raised portion of a main plate 201. A plurality of teeth 205b which extend around the circumference of a gear wheel 205c of third wheel and pinion 205 are formed by blanking. Protrusion 201a and the raised portion from which it is formed are formed by drawing from main plate 201 using half blanking or plastic working. Specifically, the lower pivot supports the sags of pinion 205a. The sags (i.e. shear drop) are round portions formed by shearing at the opposite side of a burr. A protrusion 202a, formed from gear train bridge 202 by half-blanking or plastic working, serves as an upper pivot for third wheel and pinion 205.

Fourth wheel and pinion 204 includes a shaft 204c which is fixed to a pinion 204a through an interference fit. A gear wheel 204d of fourth wheel and pinion 204 includes a plurality of teeth 204b along its circumference. Fourth wheel and pinion 204 including pinion 204a, and gear wheel 204d forms one integral body and is manufactured in the same manner as third wheel and pinion 205.

Fifth wheel and pinion 206 is made in the same manner as wheel and pinions 204 and 205. Teeth 204b mesh with a pinion 206a of fifth wheel and pinion 206. Fifth wheel and pinion 206 also includes a plurality of teeth 206b which mesh with a pinion 207a of rotor 207.

Rotor 207 also includes a plurality of magnet fixing portions 207b which surround an annular magnet 207c. Pinion 207a, magnet fixing portions 207b and magnet 207c form one body. A dowel 201b of main plate 201 extends into an opening 207d of magnet 207c for pivotable support of rotor 207. Preferably, pinion 207a should have no more than eight teeth. The material used in manufacturing rotor 207 should have a thickness of no more than 0.2 mm in view of the press working process used in its formation.

Figure 8:
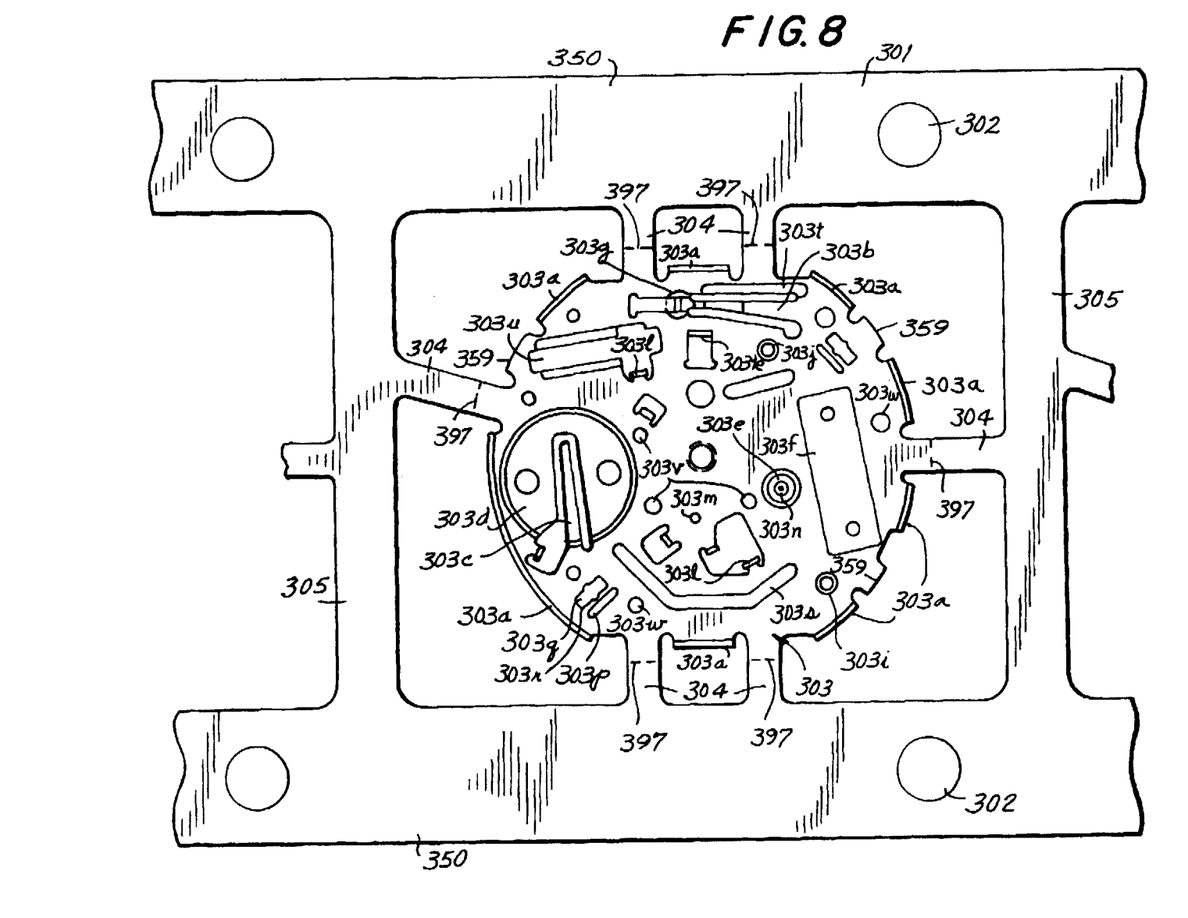
FIG. 8 is a top plan view of a main plate in accordance with another alternative embodiment of the invention.
Figure 9A:
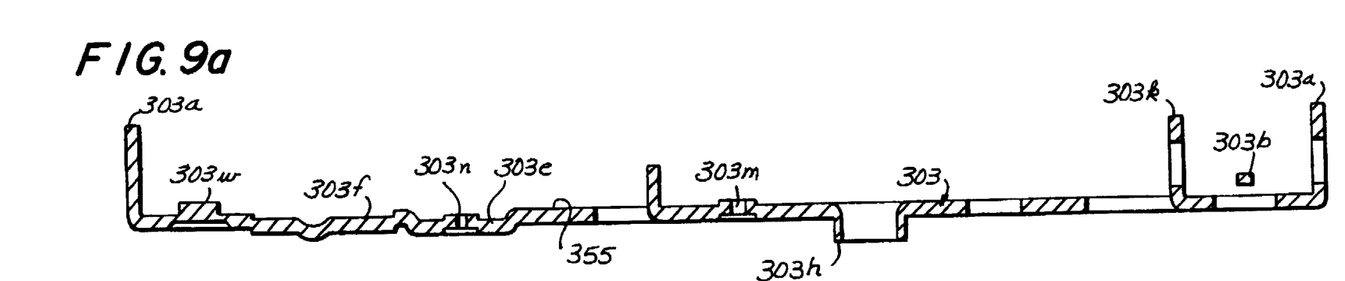
FIG. 9a is a developed cross-sectional view of FIG. 8.
Figure 9B:
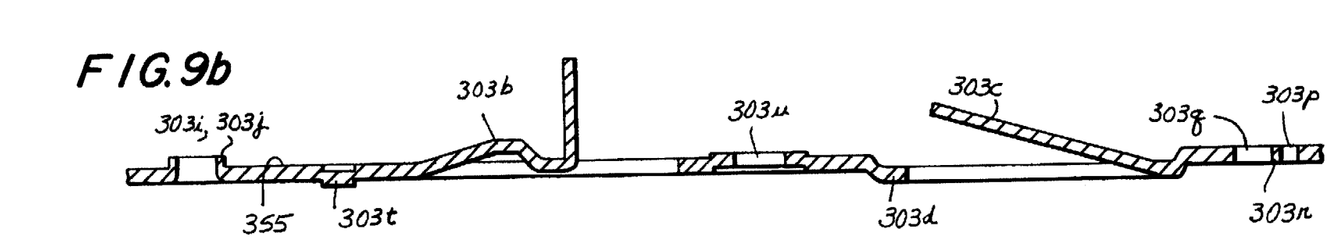
FIGS. 9b and 9c are fragmented developed cross-sectional views through different portions of the main plate of FIG. 8.
Figure 9C:
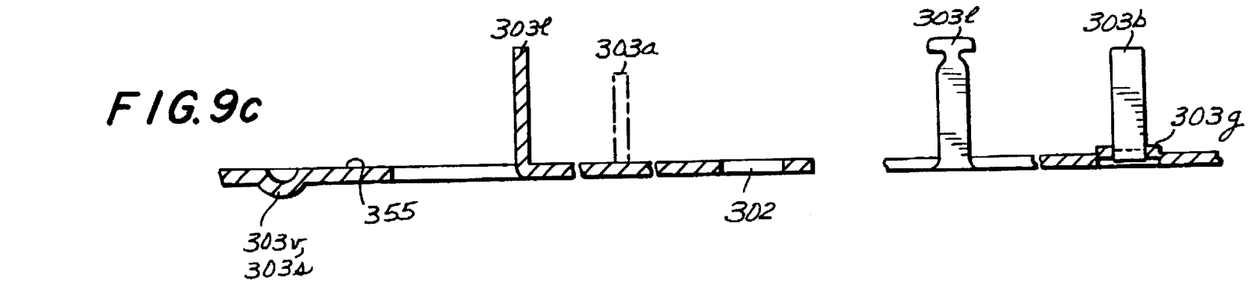

FIG. 8 illustrates part of the manufacturing process used in producing a main plate. A thin sheet (i.e. belt) of material 301 from which a main plate 303 is formed includes pilot holes 302. Pilot holes 302 serve as process guide holes. Sheet 301 includes sides 350 and bridges 305 with pilot holes 302 forming a row of openings on each side 350. Each main plate 303 is stamped out or otherwise formed between any two of the pilot holes 302 (i.e. within one pitch).

Six tie bars 304 connect each main plate 303 to sides 350 and bridges 305. The dotted lines 397 on each tie bar 304 represent the lines along which tie bars 304 are cut in separating each main plate 303 from belt 301. Each main plate 303 has walls 303a which are formed by bending or drawing the circumferential edge of main plate 303 at a substantially right angle to a top surface 355 of main plate 303. Walls 303a extend along the circumference of main plate 303 except when crossing over tie bars 304 and along flat portions 359.

As shown in FIGS. 8, 9a, 9b and 9c, integrally connected to and protruding from top surface 355 of main plate 303 are a plurality of springs 303b, 303c and 303r. Additionally, a pair of drawing portions 303d and 303e, a pair of half-blanking portions 303f and 303g formed by half-blanking, a plurality of bushing portions 303h, 303i and 303j and a pair of bending portions 303k and 303l are integrally connected to main plate 303. Main plate 303 also includes a plurality of sheared holes 303m, 303n, 303p, 303q and 303u, band-liked bending portions 303s, 303t and 303v and a dowel 303w. Portions 303s, 303t and 303v are formed by drawing or using a half-blanking process. Dowel 303w is formed by forging or the like. By applying a press working process to form main plate 303, each main plate 303 can be made in approximately 0.5 seconds.

With walls 303a provided along the circumference of main plate 303, main plate 303 can withstand the typical pressures exerted against the shafts of the timepiece associated with assembly of the hands. The frame structure of main plate 303 is, in particular, capable of withstanding the relatively significant levels of pressure required for pressing an hour hand onto the associated shaft during assembly or removal for servicing. Main plate 303 is also sufficiently durable to withstand typical external forces such as timepiece 100 being dropped (i.e. drop impact). The durability (i.e. strength) of main plate 303 is further increased by providing portions 303d, 303f, 303s and 303t on the flat portions of main plate 303.

Since tie bars 304 are in the same plane as the plane in which most of main plate 303 (i.e. reference plane) lies, sufficient processing accuracy in manufacturing main plate 303 is obtained. Walls 303a and portions 303s and 303t also serve to prevent warping of main plate 303. Preferably, the thickness of sheet 301 is not greater than 0.35 mm and is made from brass, phosphor bronze, beryllium-copper, SnBs or the like. Although the thickness and materials noted above are preferable, other thicknesses and materials can be used.

Figure 11:
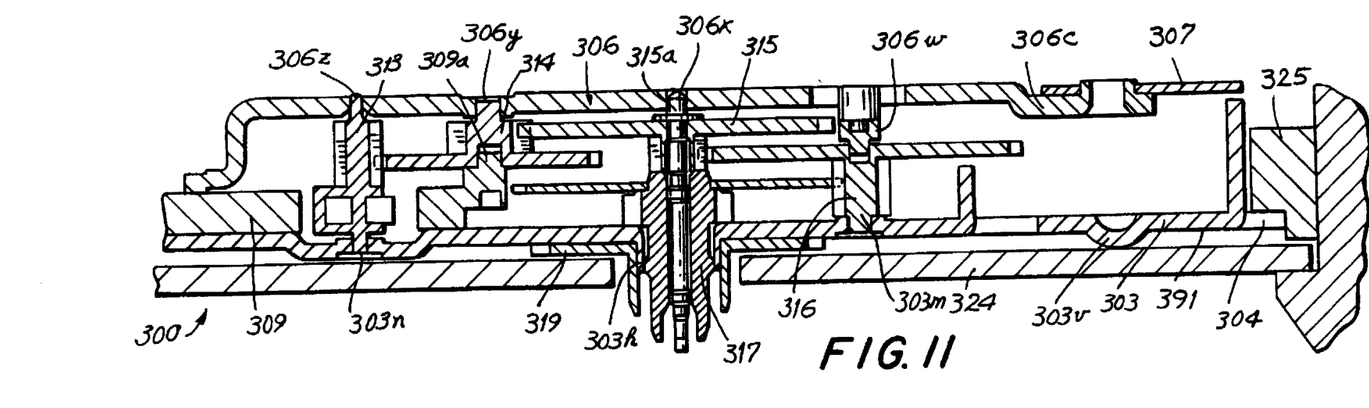
FIGS. 11, 12, 13, 14 and 15 are developed cross-sectional views through different portions of FIG. 10.
Figure 12:
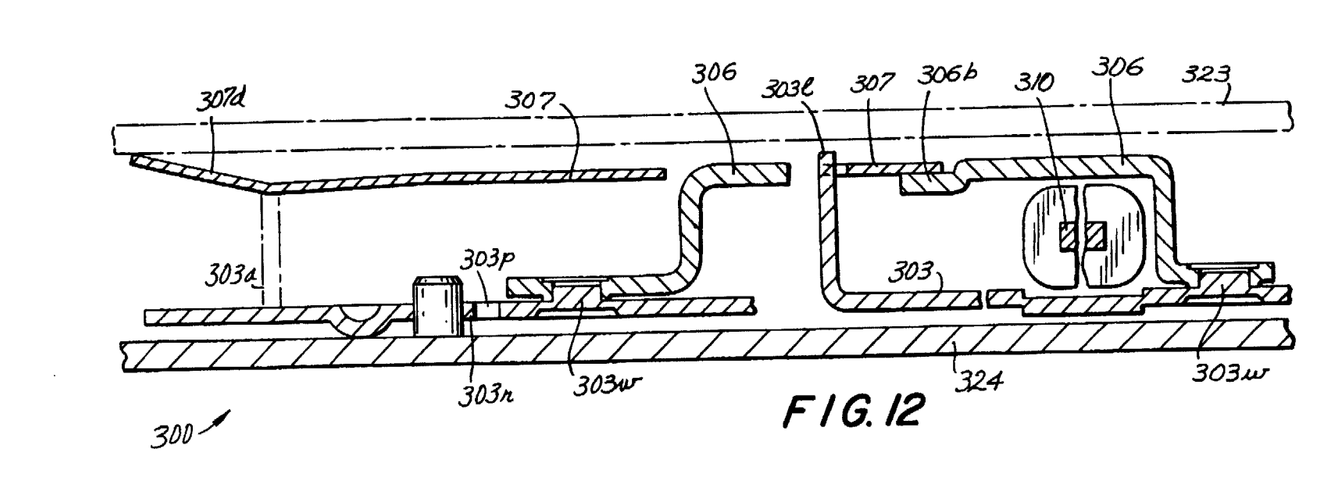
Figure 13:
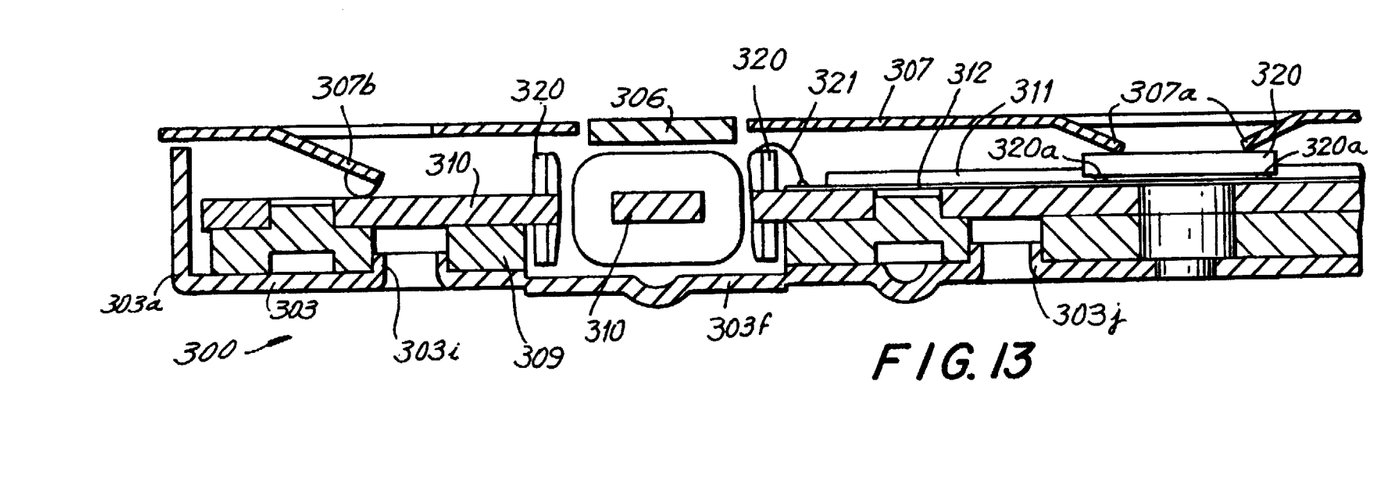

Referring to FIGS. 10–15, a timepiece 300 includes main plate 303, a gear train bridge 306 and a circuit pressing plate 307. Gear train bridge 306 and circuit pressing plate 307 are formed by press working. Timepiece 300 also includes a battery 308, a stator 309, and a coil block including a magnetic core 310, a coil frame 320, coil leads 321 (only one being shown), an insulating plate 312 and a coil lead substrate 311 which includes terminal treatment for the coil lead (FIG. 13).

As shown in FIG. 11, a rotor 313 meshes with a fifth wheel and pinion 314 which in turn meshes with a fourth wheel and pinion 315. A third wheel and pinion 316 meshes with fourth wheel and pinion 315. An hour wheel 319 supports an hour hand (not shown). A minute wheel 318 supports a minute hand (not shown). Center wheel and pinion 317 is driven by third wheel and pinion 316.

Figure 10:
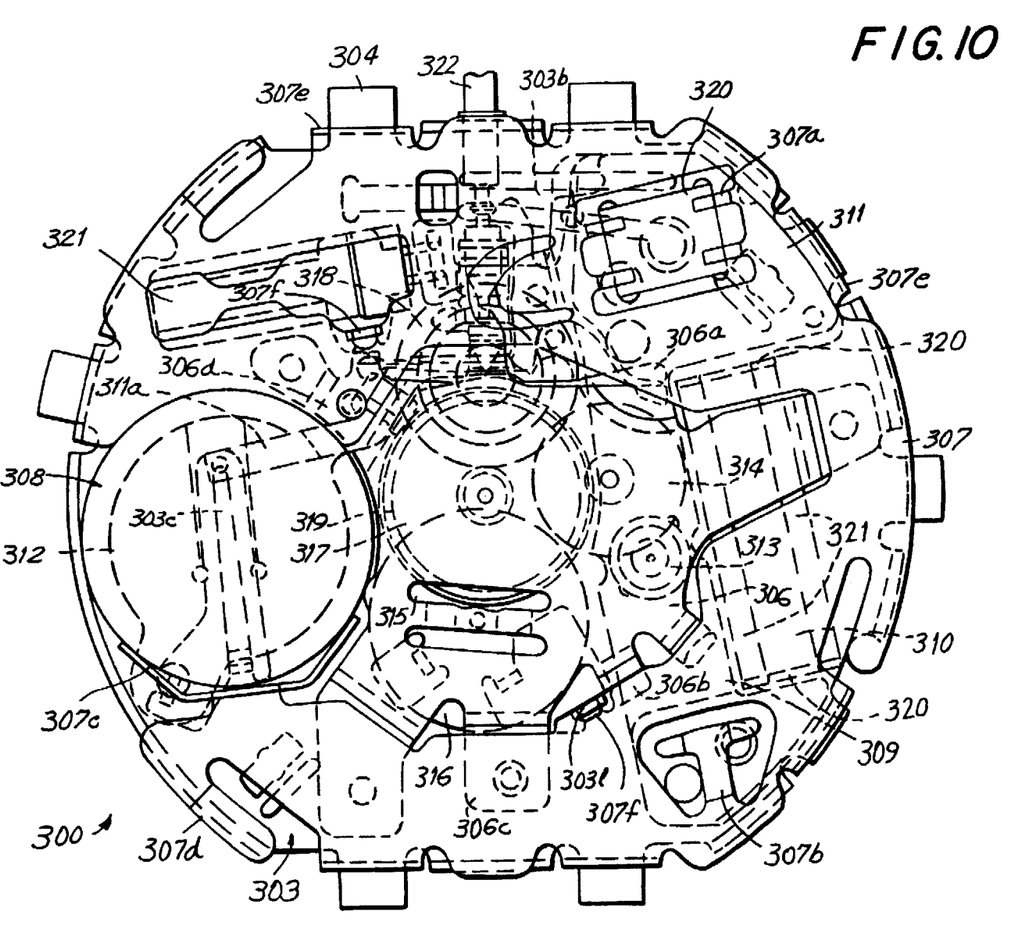
FIG. 10 is a top plan view of a timepiece including the main plate of FIG. 8 in accordance with another alternative embodiment of the invention.
Figure 10A:
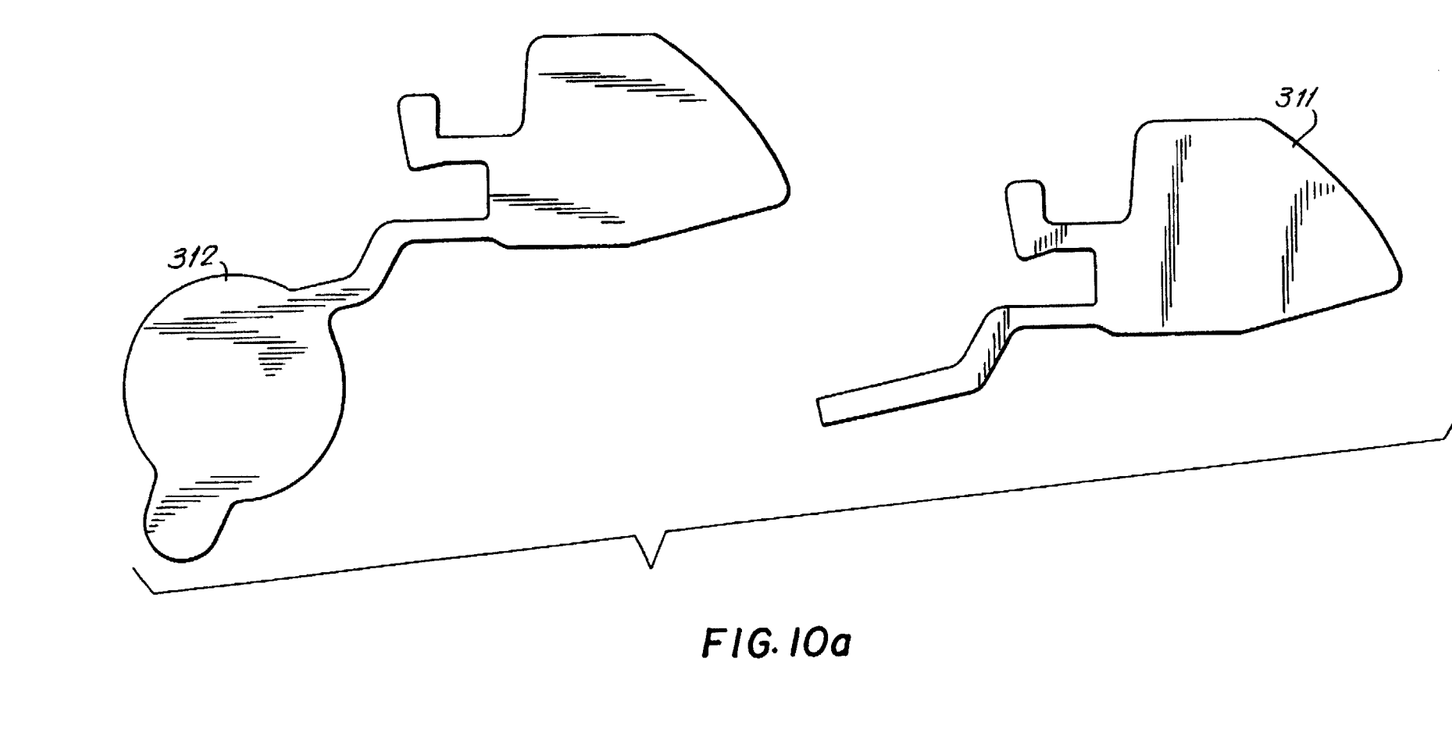
FIG. 10a is a top plan view of a coil lead substrate and insulating plate of FIG. 10.
Figure 15:
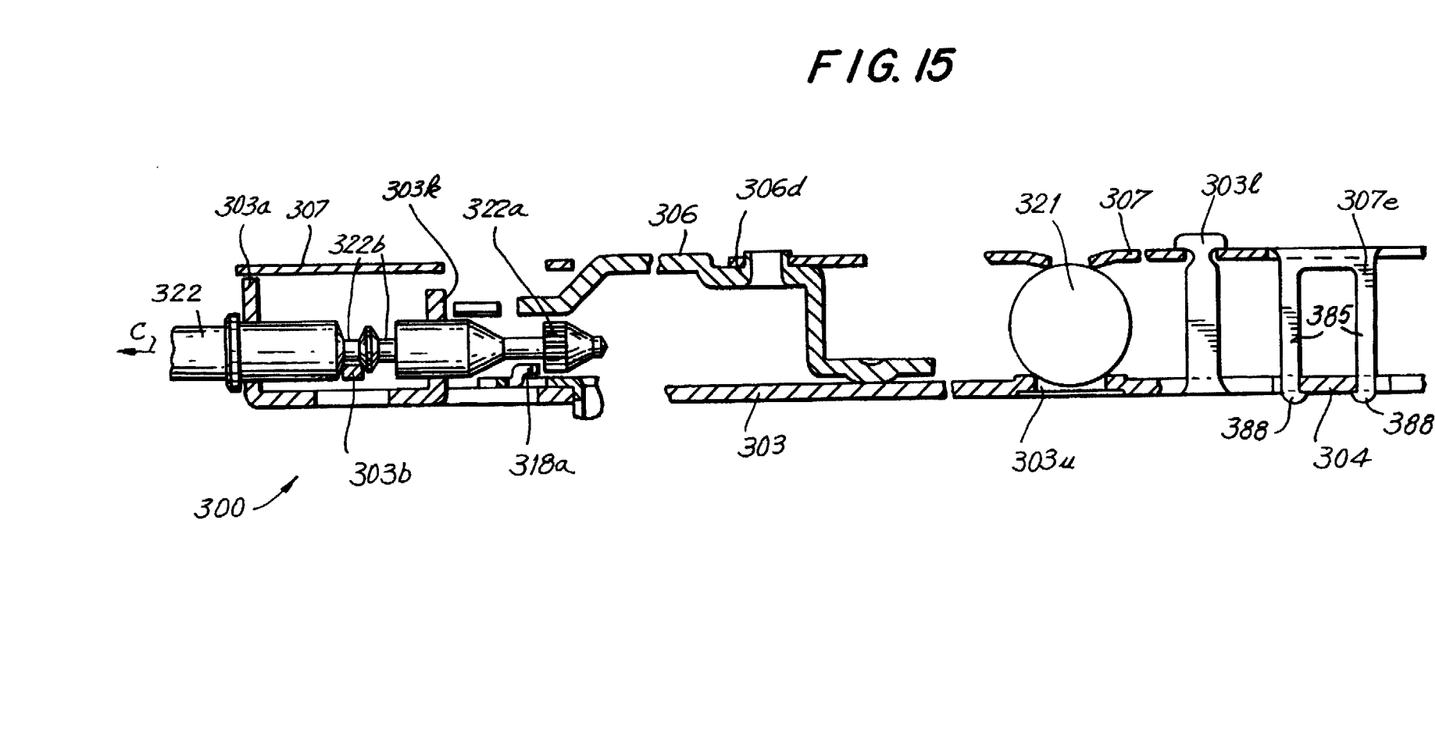

Minute wheel 318 can be operably coupled to a winding stem 322 (see FIGS. 10 and 15). More particularly, a pinion 322a of winding stem 322 is operable for engaging a plurality of teeth (crown gear) 318a of minute wheel 318 when winding stem 322 is pushed outwardly in a direction denoted by an arrow C. Winding stem 322 includes a divided groove 322b for positioning winding stem 322 at multiple step positions in cooperation with a spring 303b. Wall 303a and a bent portion 303k support winding stem 322. Spring 303b is formed from main plate 303 and is initially distorted so that it presses against winding stem 322 towards circuit pressing plate 307. When winding stem 322 is moved one step in the direction of arrow C for repositioning the hands of timepiece 300, spring 303b is pressed downwardly by a sloped portion 375 to permit entry in the other part of groove 322b. Pinion 322a is now positioned to engage teeth (i.e. crown gear) 318a for rotation of minute wheel 318.

As shown in FIG. 13 a MOS-IC chip 320 is mounted on coil lead substrate 311 and is pressed by four springs 307a formed from circuit pressing plate 307. A quartz crystalline oscillating unit 321 is electrically connected and fixed to coil lead substrate 311. Stator 309 is horizontally positioned along the external diameter of a pair of projecting portions 303i and 303j of main plate 303. Magnetic coil 310 is disposed on stator 309.

Bumps 320a made of a conductive material such as gold (Au) are formed on MOS-IC chip 320 and are pressed against a wiring pattern (not shown) formed on coil lead substrate 311 so as to electrically connect MOS-IC chip 320 to the wiring pattern. Chip 320 is biased towards coil lead substrate 321 by a pair of springs 307a formed in circuit pressing plate 307. The pressure exerted upon coil lead substrate 311 by chip 320 is transmitted through coil lead substrate 311 to magnetic core 310. Further, the pressure brings magnetic core 310 into contact with stator 309 to provide the desired magnetic coupling. Stator 309 is also positioned relative to magnetic core 310 to provide the desired magnetic coupling due to the pressure exerted against magnetic core 310 from one or more springs 307b of circuit pressing plate 307.

As shown in FIG. 11 rotor 313 pivots in an opening 303n of main plate 303 and in an opening 306z of gear train bridge 306. Fifth wheel and pinion 314 is pivotably supported by a dowel 309a formed in stator 309 and rotates within an opening 306y of gear train bridge 306. Center wheel and pinion 317 is supported by a bushing portion 303h of main plate 303. Fourth wheel and pinion 315 is mounted on top of center wheel and pinion 317 and rotates independently thereof along the same axis of rotation. Fourth wheel and pinion 315 has a shaft 315a which extends into an opening 306x of gear train bridge 306 for rotatable support. Center wheel and pinion 317 serves as a lower pivot for center wheel and pinion 315. Third wheel and pinion 316 is rotatably supported in part by a dowel 306w of gear train bridge 306. Dowel 306w is formed using an extruded pressing process. Third wheel and pinion 316 is also rotatably supported by main plate 303 and extends into an opening 303m of main plate 303.

As shown in FIG. 15, quartz crystal oscillating unit 321 is guided by the rim of an opening 303u of main plate 303 for positioning quartz crystal oscillating unit 321 on main plate 303. A portion of a round opening 303u is protruded by half-blanking. Once seated in opening 303u, quartz crystal oscillating unit 321 is biased toward main plate 303 by circuit pressing plate 307.

As shown in FIG. 12 gear train bridge 306 is positioned relative to main plate 303 by dowels 303w formed in main plate 303. As shown in FIGS. 10–15, circuit pressing plate 307 presses against a plurality of projections 306a, 306b, 306c and 306d of gear train bridge 306 for locating pressing plate 307 at a fixed distance relative to main plate 303.

Figure 14:
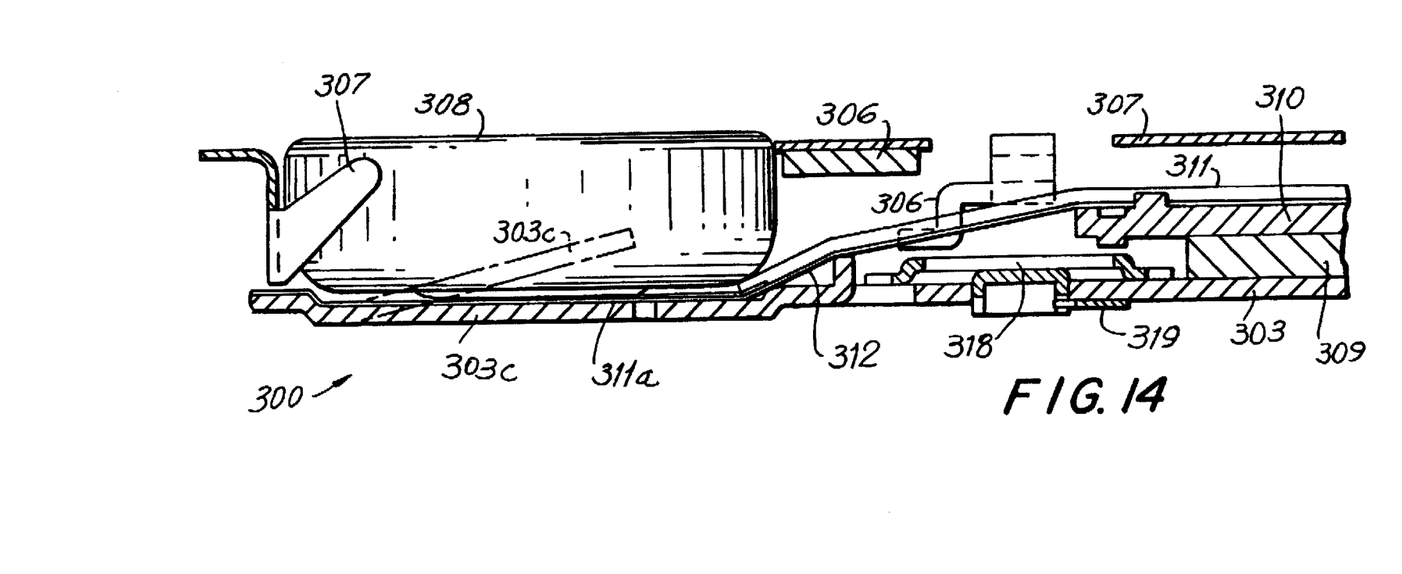

As shown in FIG. 14, battery 308 is pressed indirectly by a spring 303c of main plate 303 resulting in one terminal of battery 308 contacting an extension (i.e. overhang) 311a of coil lead substrate 311. An insulating plate 312 is disposed between extension 311a and spring 303c to prevent the flow of current therebetween (i.e. short-circuit). A spring 307c of circuit pressing plate 307 presses against the positive terminal of battery 308. Since circuit pressing plate 307 is electrically conductive, battery 308 is electrically in contact with the VSS electrode of MOS-IC chip 320. Circuit pressing plate 307 also includes three springs 307d which directly contact a back cover 323 of timepiece 100 (see FIG. 12).

As shown in FIG. 15, clips (i.e. racks) 307e formed in circuit pressing plate 307 are used to fix circuit pressing plate 307 to main plate 303. Each clip 307e has a pair of resilient (i.e. spring-like) legs 385 and is located near or at the external circumference of circuit pressing plate 307. Associated with each leg 385 is a notch 307f of main plate 303 which is located near one of the six tie bars 304 formed in main plate 303 and which receives a distal end 388 of leg 385. Each clip 307e is connected to main plate 303 by spreading legs 385 apart as distal ends 388 are pushed through notches 307f of main plate 303. Once distal ends 388 are beneath a bottom surface 391 of main plate 307, legs 385 assume their non-distorted shape and lock clip 307e to main plate 303. The center of circuit pressing plate 307 is spacially disposed above main plate 303 (i.e. floats).

As shown in FIGS. 10 and 11, three protrusions 303v extend below bottom surface 391 of main plate 303 and contact dial face 324 providing a sufficient gap between main plate 303 and dial face 324 for hour wheel 319 to freely rotate.

Each tie bar 304 after it has been cut along dotted line 397 is used to position a casing ring 325 at a predetermined distance from main plate 303. Although sheet 301 and tie bars 304 have been described heretofore with respect to the manufacture of main plate 303, other members of timepiece 300 such as gear train bridges, circuit pressing plates and the like can be manufactured using a sheet 301 with tie bars 304. Any number of tie bars 304 greater than two can be used in the manufacture of the main plates, gear train bridges, circuit pressing plates and the like.

As now can be readily appreciated, a timepiece 100 (or 300) having a main plate 101 (or 303) and a gear train bridge 102 (or 306) can be manufactured using a thin plate material. Bending, forming a band-like stretched portion, stretching (i.e. drawing) or the like of portions of main plate 101 (301) and gear train bridge 102 (306) provides a frame structure which suitably supports all of the internal members of the time piece and improves the rigidity of the timepiece. Main plate 101 (301) and gear train bridge 102 (306) can be assembled using integrally connected spring like members to position, electrically connect and to maintain the position of internal members of the timepiece. Consequently the number of individual pieces required to assemble the timepiece is reduced. Furthermore, since press working (i.e. forging, bending, drawing or shearing) can be used in producing the main plate and gear train bridge, mass production is possible which lowers the overall manufacturing cost of the timepiece.

By providing walls (i.e. bending portions) 303a, which are formed by bending or drawing, and band-like drawing portions 303s, 303t and 303v on the circumference of main plate (i.e. frame) 303, timepiece 300 can be manufactured using relatively thin plate materials. Timepiece 300 can withstand typical external forces produced from being dropped on the ground without adversely affecting its integrity. All pressing steps in producing main plate 303, gear train bridge 306 and circuit pressing plate 307 can be carried out by press working (i.e. plastic process) including shearing, bending, drawing, forging (with or without heating) and the like. Consequently, the time required to manufacture timepiece 300 can be reduced further lowering its manufacturing cost and improving mass production capabilities.

Still further, since tie bars 304 and sheet 301 are in substantially the same plane as main plate 303, a desirable level of precision (i.e. accuracy) in manufacturing main plate 303 is obtained. Certain springs of gear train bridge 102 and circuit pressing plate 307 also can be made as leaf springs especially where more than one spring such as spring 307a or 307d of circuit pressing plate 307 is required to exert pressure on an internal or external member of the timepiece, respectively.

It will thus be seen that the objects set forth above and those made apparent from the preceding description are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A timepiece, comprising:
   a timekeeping mechanism including a plurality of internal members for performing functions associated with timekeeping;
   at least two frames positioned in spaced relation, formed of a thin plate material and integrally formed for supporting and positioning at least a portion of a plurality of said internal members, at least one of said frames being formed with a plurality of integral elongated portions deformed out of the plane of the plate in the vicinity of the periphery thereof for providing rigidity to said plate and at least one of the frames including a plate spring formed integrally therein by plastic working for resiliently positioning the height of at least one of the plurality of internal members between said at least two frames by direct pressure exerted by said plate spring on said at least one of said internal members.

2. The timepiece of claim 1, wherein said frame includes a bearing means formed integrally therein at the center of the timepiece.

3. The timepiece of claim 1, wherein at least one of said first and second frames is formed of an electrically conductive material, said internal members including means requiring electrical current, said frame formed of electrically conductive material being positioned to conduct electric current to said means requiring electric current.

4. The timepiece of claim 1, and including a plurality of integral portions extending laterally from the periphery of the frame for positioning the frame and internal members supported thereby in the timepiece.

5. The timepiece of claim 4, and including a case, said laterally projecting portions of said frame being positioned to engage said case for positioning said frame within said case.

6. The timepiece of claim 1 further including a case, at least one of said frames being formed integrally with laterally extending portions for engaging the case for positioning the frames and internal members within the case.

7. The timepiece of claim 6, wherein said laterally extending portions of said at least one of said frames for engagement with said case are formed from at least a portion of a tie bar coupling said at least one of said frames to a ribbon of frames during manufacture.

8. The timepiece of claim 6, wherein said at least one of said frames is further formed with an integral leaf spring extending toward said case and away from the other of said frames for engaging the case for fixing the frames and internal members relative to the case.

9. The timepiece of claim 8, wherein said case includes a back cover, said leaf spring engaging said back cover.

* * * * *